US012222851B2

(12) United States Patent
Wang et al.

(10) Patent No.: US 12,222,851 B2
(45) Date of Patent: Feb. 11, 2025

(54) SELECTIVELY CAPTURING TRAFFIC IN SERVICE MESH

(71) Applicant: International Business Machines Corporation, Armonk, NY (US)

(72) Inventors: Yue Wang, Beijing (CN); Xinpeng Liu, Austin, TX (US); Wei Wu, Beijing (CN); Peng Hui Jiang, Beijing (CN); Xiao Ling Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 18/314,977

(22) Filed: May 10, 2023

(65) Prior Publication Data

US 2024/0378140 A1  Nov. 14, 2024

(51) Int. Cl.
G06F 11/36 (2006.01)

(52) U.S. Cl.
CPC ...... G06F 11/3688 (2013.01); G06F 11/3692 (2013.01)

(58) Field of Classification Search
CPC ......................... G06F 11/3688; G06F 11/3692
See application file for complete search history.

(56) References Cited

U.S. PATENT DOCUMENTS

| 9,965,378 | B1 * | 5/2018 | Weiner | G06F 11/3684 |
| 2017/0332544 | A1 * | 11/2017 | Conrad | G06N 20/00 |
| 2020/0112487 | A1 | 4/2020 | Inamdar et al. | |
| 2021/0081271 | A1 | 3/2021 | Doshi et al. | |
| 2021/0184945 | A1 | 6/2021 | Ranjit et al. | |
| 2021/0216406 | A1 * | 7/2021 | Silverstein | G06F 11/3055 |
| 2021/0326196 | A1 * | 10/2021 | Moss | G06F 11/3692 |
| 2022/0224637 | A1 | 7/2022 | S et al. | |
| 2022/0308990 | A1 * | 9/2022 | DeLuca | G06F 11/0793 |

OTHER PUBLICATIONS

Anonymous, "IBM to Acquire Green Hat," Database Trends and Applications, Jan. 4, 2012, 3 pages.

(Continued)

*Primary Examiner* — Joseph O Schell
*Assistant Examiner* — Matthew N Putaraksa
(74) *Attorney, Agent, or Firm* — CANTOR COLBURN LLP; James Olsen (57) ABSTRACT

A computer-implemented method for a service mesh to simulate and address a situation in which there are several transactions among services with an asynchronous relationship between the services is provided. The computer-implemented method includes identifying that the situation occurs with a response provided to a user upon a user invocation of one of the services, analyzing the situation to determine that the asynchronous relationship between the services caused an error in at least one of the several transactions, recording data of a next user invocation of the one of the services, modifying the data of the next user invocation of the one of the services to correct the error and to thereby generate modified data, simulating an execution of the next user invocation of the service using the modified data and confirming that the modified data corrects the error based on results of the simulating.

20 Claims, 7 Drawing Sheets

(56) References Cited

OTHER PUBLICATIONS

Anonymous, "Kiali—The Console for Istio Service Mesh," URL: https://kiali.io/, Received: Feb. 1, 2023, 3 pages.
Anonymous, "Kiali—Tracing," URL: https://kiali.io/docs/features/tracing/, Received: Feb. 1, 2023, 3 pages.
Anonymous, "Rational Integration Tester (IBM Green Hat)," URL: https://www.automation-consultants.com/rational-integration-tester-ibm-green-hat/, Retrieved: Feb. 1, 2023, 5 pages.

* cited by examiner

SELECTIVELY CAPTURING TRAFFIC IN SERVICE MESH

BACKGROUND

The present invention generally relates to a service mesh, and more specifically, to a method of selectively capturing traffic in a service mesh to simulate and address an issue.

Modern applications are typically architected as distributed collections of microservices, with each collection of microservices performing some discrete business function. A service mesh is a dedicated infrastructure layer that can be added to applications. It allows for transparent addition of capabilities like observability, traffic management and security, without adding them to code. The term "service mesh" describes both the type of software used to implement this pattern, and the security or network domain that is created when that software is used. As the deployment of distributed services, such as in a Kubernetes-based system, grows and becomes more complex, it can become harder to understand and manage. Its requirements can include discovery, load balancing, failure recovery, metrics and monitoring. A service mesh also often addresses more complex operational requirements, like testing, canary deployments, rate limiting, access control, encryption and end-to-end authentication.

SUMMARY

Embodiments of the present invention are directed to a computer-implemented method for a service mesh to simulate and address a situation in which there are several transactions among services with an asynchronous relationship between the services. The computer-implemented method includes identifying that the situation occurs with a response provided to a user upon a user invocation of one of the services, analyzing the situation to determine that the asynchronous relationship between the services caused an error in at least one of the several transactions, recording data of a next user invocation of the one of the services, modifying the data of the next user invocation of the one of the services to correct the error and to thereby generate modified data, simulating an execution of the next user invocation of the service using the modified data and confirming that the modified data corrects the error based on results of the simulating.

As a result of an execution of the computer-implemented method, a complex invocation sequence in a production environment can be reproduced to a simulation environment. This allows for a capture of necessary traffic to address issues in the production environment. Meanwhile, normal workloads in the production environment will not be impacted and a sampling of traffic can be adjusted according to a real-time situation.

In accordance with additional or alternative embodiments of the invention, the service includes an electronic product order form.

In accordance with additional or alternative embodiments of the invention, the situation includes the electronic product order form using a product catalog querier to obtain a product catalog from a catalog database prior to the product catalog being stored in the catalog database.

In accordance with additional or alternative embodiments of the invention, the recording of the data includes updating a sampling rate of the data and adding a new header.

In accordance with additional or alternative embodiments of the invention, the updating of the sampling rate of the data includes setting the sampling rate at 100% and the new header includes a tracing instructing.

In accordance with additional or alternative embodiments of the invention, the modifying of the data includes changing a data timestamp.

Embodiments of the invention further provide computer program products and computer systems having substantially the same features and technical benefits as the above-described computer-implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
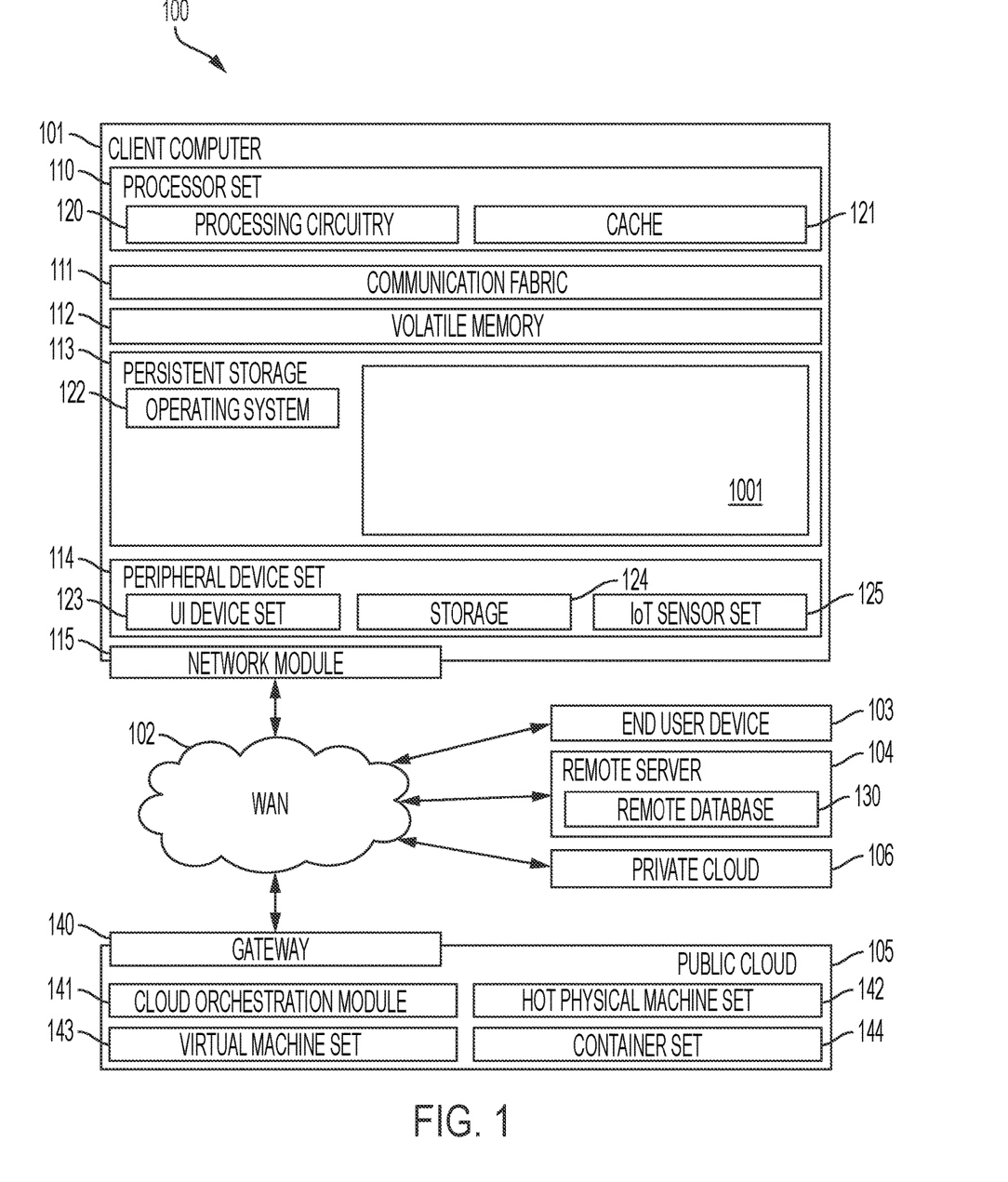
FIG. 1 is a schematic diagram of a computing environment for executing a computer-implemented method for selectively capturing traffic in a service mesh to simulate and address an issue with a service invoke chain in accordance with one or more embodiments of the present invention.

With reference to FIG. 1, a computer or computing device 100 that implements a computer-implemented method for selectively capturing traffic in a service mesh to simulate and address an issue with a service invoke chain in accordance with one or more embodiments of the present invention is provided. The computer or computing device 100 of FIG. 1 contains an example of an environment for the execution of at least some of the computer code involved in performing the inventive methods, such as the block 1001 of the computer-implemented method for selectively capturing traffic in a service mesh to simulate and address an issue with a service invoke chain. In addition to the computer-implemented method for selectively capturing traffic in a service mesh to simulate and address an issue with a service invoke chain of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 701 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Turning now to an overview of technologies that are more specifically relevant to aspects of the invention, service-to-service communication is what makes a distributed application possible. Routing this communication, both within and across application clusters, becomes increasingly complex as the number of services grow. Istio helps reduce this complexity while easing the strain on development teams. Istio is an open-source service mesh that layers transparently onto existing distributed applications. Istio's powerful features provide a uniform and more efficient way to secure, connect and monitor services. Istio can be a path to load balancing, service-to-service authentication, and monitoring with few or no service code changes. Its powerful control plane brings vital features. These include, but are not limited to, secure service-to-service communication in a cluster with encryption, strong identity-based authentication and authorization, automatic load balancing, fine-grained control of traffic behavior with rich routing rules, retries, failovers and fault injection, pluggable policy layers and configuration API supporting access controls, rate limits and quotas and automatic metrics, logs and traces for all traffic within a cluster, including cluster ingress and egress.

Istio is designed for extensibility and can handle a diverse range of deployment needs. Istio's control plane runs on Kubernetes, for example, and an Istio user can add applications deployed in that cluster to that user's mesh, extend the mesh to other clusters or connect virtual machines (VMs) or other endpoints running outside of Kubernetes.

In operation, an Istio service mesh is logically split into a data plane and a control plane. The data plane includes a set of intelligent proxies (or envoys) that are deployed as sidecars. These proxies mediate and control all network communication between microservices. They also collect and report telemetry on all mesh traffic. The control plane manages and configures the proxies to route traffic. Kiali is a console for an Istio service mesh. Kiali users often use a graph feature to visualize their mesh traffic. In a side panel, when selecting a graph node, the user will be presented with a traces tab that lists available traces for a certain time. When a user selects a trace, the graph will display an overlay for the trace's spans and the side panel will display span details and offer links back to the trace detail views.

A problem with tools like Kiali is that they typically only provide a capability to view a transaction path and do not provide for capabilities to simulate the transaction with recorded trace data. It can therefore be hard to find a root cause of a problem when the problem is related to several transactions among services, and the invoke relationship between services are asynchronized. For example, in a simulator environment, there may not be a lot of product catalogs needing to be updated. Therefore, when product A catalog updater sends product A catalog to the product catalog updater, the product catalog updater can store a new product A catalog to a catalog database (DB). Subsequently, when clients use an electronic product order form, the electronic product order form can refer to a new product A order service based on the catalog retrieved from the catalog DB. Meanwhile, in a production environment, there may be a lot of product catalogs that need to be updated. Therefore, when the product A catalog updater sends the product A catalog to the product catalog updater, the product catalog updater may not store new product A catalog to the catalog DB, due to other product catalogs needing to be stored to the catalog DB beforehand. Subsequently, when the client uses the electronic product order form, the electronic product order form may still refer to the old product A order service based on the catalog that is retrieved from the catalog DB.

Turning now to an overview of the aspects of the invention, one or more embodiments of the invention address shortcomings of the above-described approach by providing for a method to simulate a same service invoke sequence in a simulator environment as in a production environment.

The above-described aspects of the invention address the shortcomings of known approaches by providing for a production environment and a simulator environment and a method for a service mesh to simulate and address a situation in which there are several transactions among services with an asynchronous relationship between the services. The method includes identifying a solution for the situation in a first environment and simulating the solution in a second environment to confirm that the solution is corrective.

Figure 2:
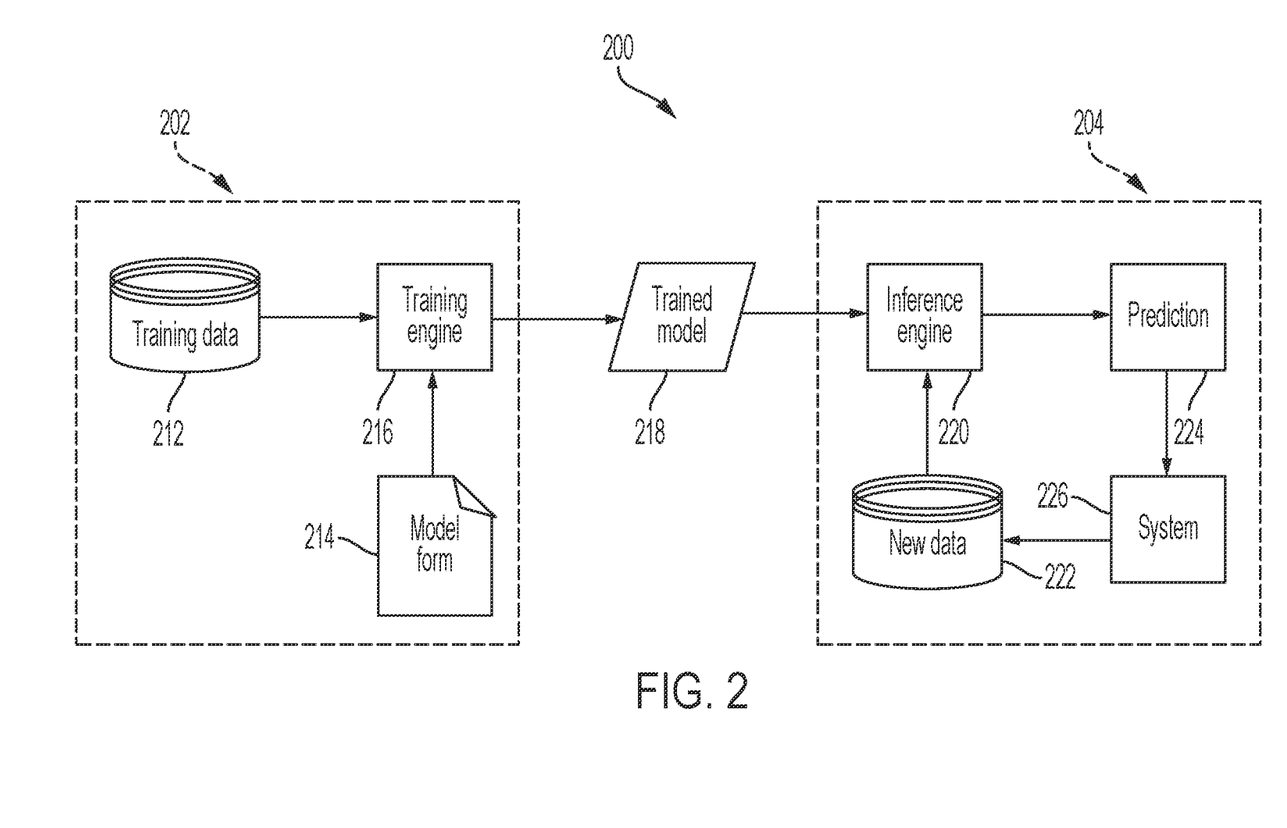
FIG. 2 is a block diagram of components of a machine learning training and inference system according to one or more embodiments of the present invention.

Turning now to a more detailed description of aspects of the present invention, FIG. 2 depicts a block diagram of components of a machine learning training and inference system 200. The machine learning training and inference system 200, in accordance with one or more embodiments of the invention, can utilize machine learning techniques to perform tasks, such as simulating a same service invoke sequence of a simulator environment in a production environment to address an issue in the production environment. More specifically, one or more embodiments of the invention described herein can incorporate and utilize rule-based decision making and artificial intelligence (AI) reasoning to accomplish the various operations described herein, namely.

Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information during a web conference, for example. In one or more embodiments of the invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Figure 3:
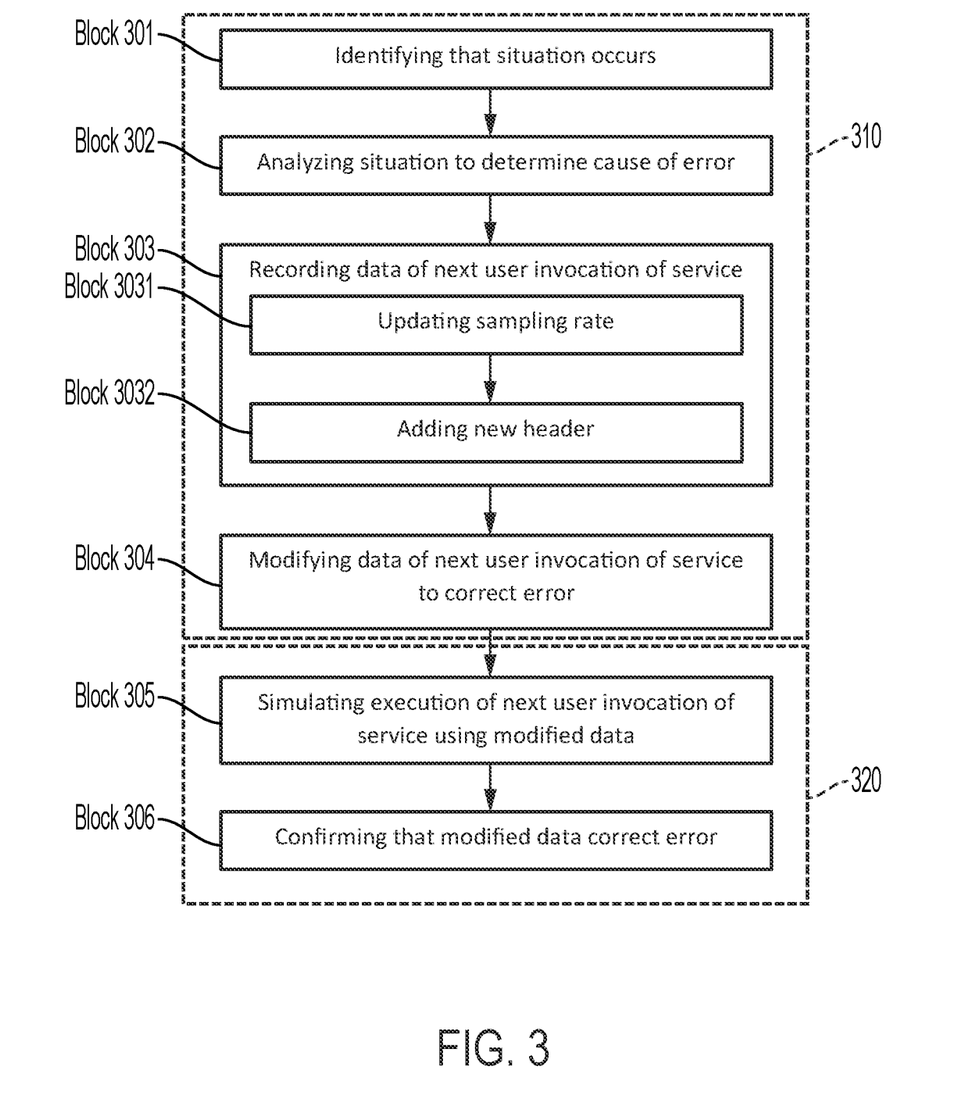
FIG. 3 is a flow diagram illustrating a computer-implemented method for selectively capturing traffic in a service mesh to simulate and address an issue with a service invoke chain in accordance with one or more embodiments of the present invention.

With reference to FIG. 3, a computer-implemented method 300 is provided for a service mesh to simulate and address a situation in which there are several transactions among services with an asynchronous relationship between the services. As shown in FIG. 3, the computer-implemented method 300 includes identifying that the situation occurs with a response provided to a user upon a user invocation of one of the services (block 301), where the one of the services can include or be provided as an electronic product order form, analyzing the situation to determine that the asynchronous relationship between the services caused an error in at least one of the several transactions (block 302), recording data of a next user invocation of the one of the services (block 303), such as when the user returns to the electronic product order form, modifying the data of the next user invocation of the one of the services to correct the error and to thereby generate modified data (block 304), simulating an execution of the next user invocation of the service using the modified data (block 305) and confirming that the modified data corrects the error based on results of the simulating (block 306). The recording of the data of block 303 can include updating a sampling rate of the data by setting the sampling rate to 100% (block 3031) and adding a new header, including a tracing instruction, to a request of the next user invocation of the service (block 3032).

In accordance with one or more embodiments of the present invention, as noted above the service can include or be provided as an electronic product order form. In these or other cases, the situation can include or be provided as the electronic product order form using a product catalog querier to obtain a product catalog from a catalog database prior to the product catalog being stored in the catalog database, which results in an old or out-of-date catalog being provided to a user in response to a user invocation of the electronic product order form. The following description will generally relate to the cases noted hereinabove as an example. This is done for clarity and brevity and is not intended to otherwise limit the overall disclosure.

The computer-implemented method 300 of FIG. 3 can be more generally described as a computer-implemented method for a service mesh to simulate and address a situation in which there are several transactions among services with an asynchronous relationship between the services. Still referring to FIG. 3, the computer-implemented method includes identifying a solution for the situation in a first environment 310 and simulating the solution in a second environment to confirm that the solution is corrective 320. As used herein, the first environment includes or is provided as a production environment and the second environment includes or is provided as a simulator environment that can be run on a processor.

Figure 4A:
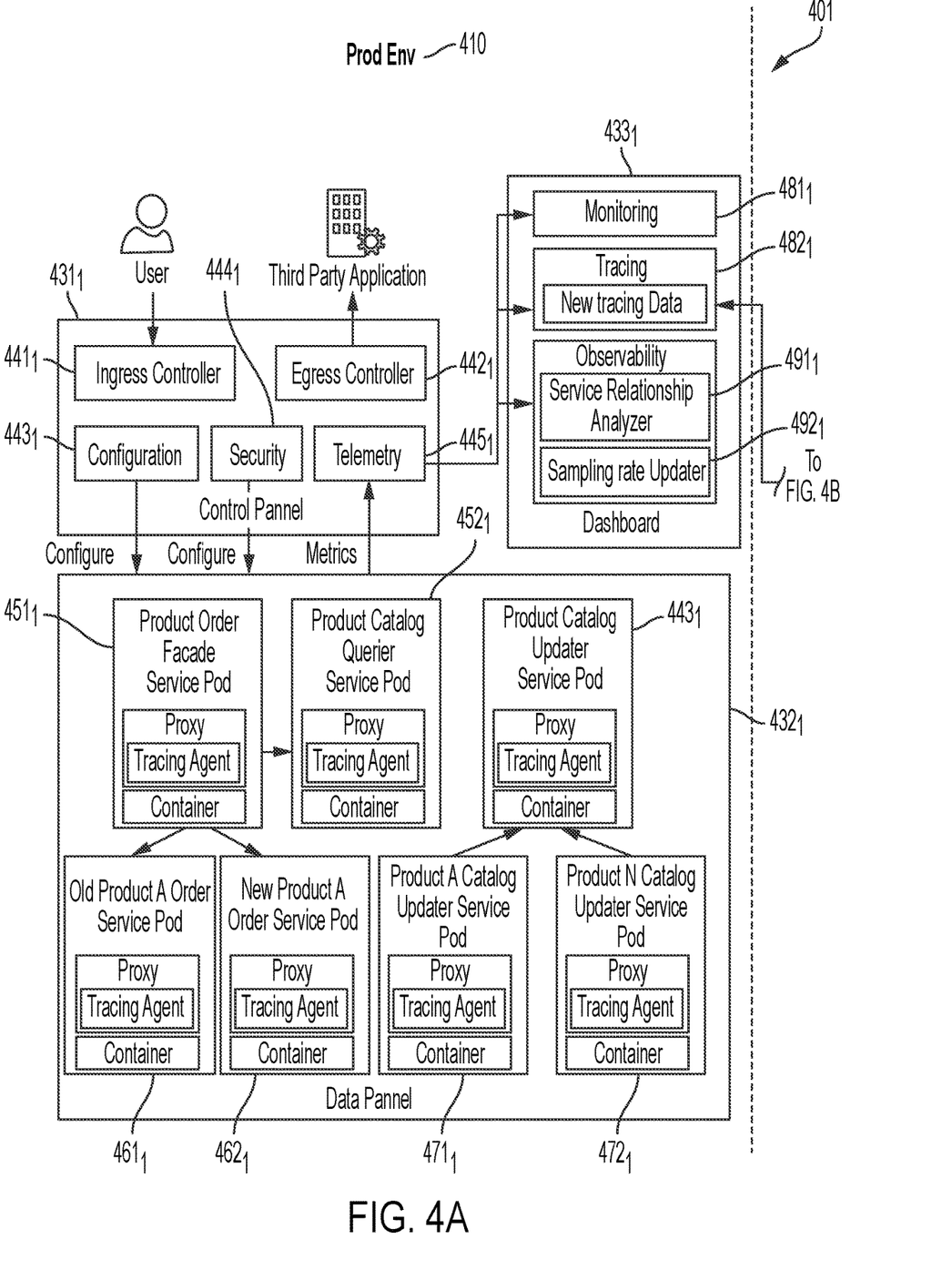
FIGS. 4A and 4B are schematic diagrams illustrating a computing system for executing the computer-implemented method of FIG. 3 in accordance with one or more embodiments of the present invention.
Figure 4B:
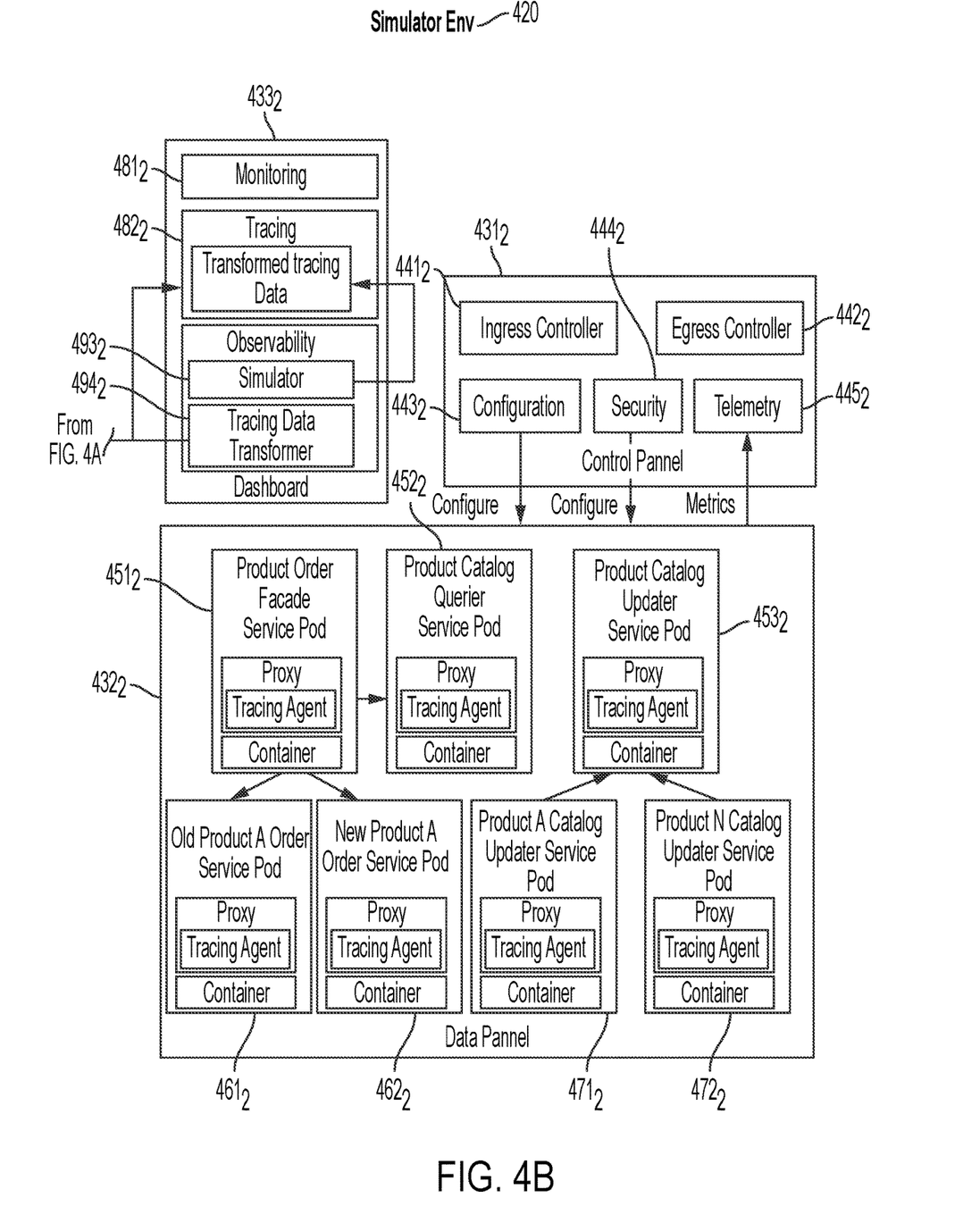

With reference to FIGS. 4A and 4B, the computer-implemented methods of FIG. 3 can be executed by a computing system 401. The computing system 401 includes a production environment 410 and a simulator environment 420 that can be embodied together or separately in a processor. The production environment 410 and the simulator environment 420 both include a control panel $431_{1,2}$, a data panel $432_{1,2}$ and a dashboard $433_{1,2}$. Each control panel $431_{1,2}$ includes an ingress controller $441_{1,2}$, which is receptive of user invocations of a service, and an egress controller $442_{1,2}$, which is communicative with a third party application that provides the service being invoked, as well as a configuration unit $443_{1,2}$, a security unit $444_{1,2}$ and a telemetry unit $445_{1,2}$. Each data panel $432_{1,2}$ includes an electronic product order form service pod $451_{1,2}$, a product catalog querier service pod $452_{1,2}$, which is receptive of communications from the electronic product order form service pod $451_{1,2}$, and a product catalog updater service pod $453_{1,2}$. Each of the electronic product order form service pod $451_{1,2}$, the product catalog querier service pod $452_{1,2}$ and the product catalog updater service pod $453_{1,2}$ includes a tracing agent and a container. Each of the electronic product order form service pods $451_{1,2}$ is communicative with an old product A order service pod $461_{1,2}$ and a new product A order service pod $462_{1,2}$. Each of the product catalog updater service pods $453_{1,2}$ is communicative with a product A catalog updater service pod $471_{1,2}$ and a product N catalog updater service pod $472_{1,2}$. Each old product A order service pod $461_{1,2}$, each new product A order service pod $462_{1,2}$, each product A catalog updater service pod $471_{1,2}$ and each product N catalog updater service pod $472_{1,2}$ includes a tracing agent and a container. Each dashboard $433_{1,2}$ includes a monitoring unit $481_{1,2}$, a tracing unit $482_{1,2}$ and an observability unit $483_{1,2}$.

The monitoring unit $481_1$, the tracing unit $482_1$ and the observability unit $483_1$ of the dashboard $433_1$ of the production environment 410 are each communicative with the telemetry unit $445_1$ of the production environment 410. The tracing unit $482_1$ of the dashboard $433_1$ of the production environment 410 includes new tracing data. The observability unit $483_1$ of the dashboard $433_1$ of the production environment 410 includes a service relationship analyzer $491_1$ and a sampling rate updater $492_1$.

The tracing unit $482_2$ of the dashboard $433_2$ of the simulator environment 420 includes transformed or modified tracing data. The observability unit $483_2$ of the dashboard $433_2$ of the simulator environment 420 includes a simulator $493_2$, which is communicative with the tracing unit $482_2$, and a tracing data transformer $494_2$, which is communicative with the tracing units $482_{1,2}$ of the dashboards $433_{1,2}$ of the production and simulator environments 410 and 420.

During an operation of the computing system 401, which can be characterized as a service mesh, the computing system 401 can simulate and address a situation in which there are several transactions among services with an asynchronous relationship between the services. The computing system 401 initially identifies that the situation occurs with a response provided to a user upon a user invocation of one of the services and then analyses the situation to determine if indeed it was the asynchronous relationship between the services that caused an error in at least one of the several transactions. If so, the computing system 401 records data of a next user invocation of the one of the services. The recording of the data can be effectively executed or caused by the sampling rate updater $492_1$, which updates a sampling rate of the data by setting the sampling rate to 100% such that data of the next user invocation of the one of the services can be recorded as shown in the exemplary code provided below.

```
If
    the key in header is 'tracing_type',
    and the value is 'all':
        the sampling rate is 100%
apiVersion: apps/v1
kind: Deployment
metadata:
    name: sleep
spec:
    ...
    template:
        metadata:
            ...
            annotations:
                ...
                proxy.istio.io/config: |
                    tracing:
                        sampling: 100
                        custom_tags:
                            my_tag_header:
                                header:
                                    name: tracing_type
                                    value: all
        spec: ...
```

At this point, the ingress controller $441_1$ adds a new header, which includes a tracing instruction, to a request associated with the next user invocation of the one of the services. This tracing instruction in the new header causes the tracing agent of the product catalog updater service pod $453_1$ to generate data of the next user invocation of one of the services based on the new sampling rate as shown in the exemplary code provided below.

```
If
    the key in header is 'tracing_type',
    and the value is 'all':
        the sampling rate is 100%
        and store http.request and
    http.response to tracing data
```

The tracing data transformer $494_2$ modifies the data of the next user invocation of the one of the services by changing a data timestamp of the data to correct the error caused by the asynchronous relationship between the service and other services of the service mesh and to thereby generate modified data, which is provided to the tracing units $482_{1,2}$ as shown in the exemplary code provided below.

```
relativeStartTime
= startTime – transactionStartTime
For example,
transactionStartTime = 1665675500
    startTime =1665675510
relativeStartTime
= startTime – transactionStartTime
= 1665675500 – 1665675500
= 0
2) startTime = 1665675570
relativeStartTime
= startTime – transactionStartTime
= 1665675530 – 1665675500
= 30
```

The simulator $493_2$ simulates an execution of the next user invocation of the service using the modified data and confirms that the modified data corrects the error based on results of the simulating.

Figure 5:
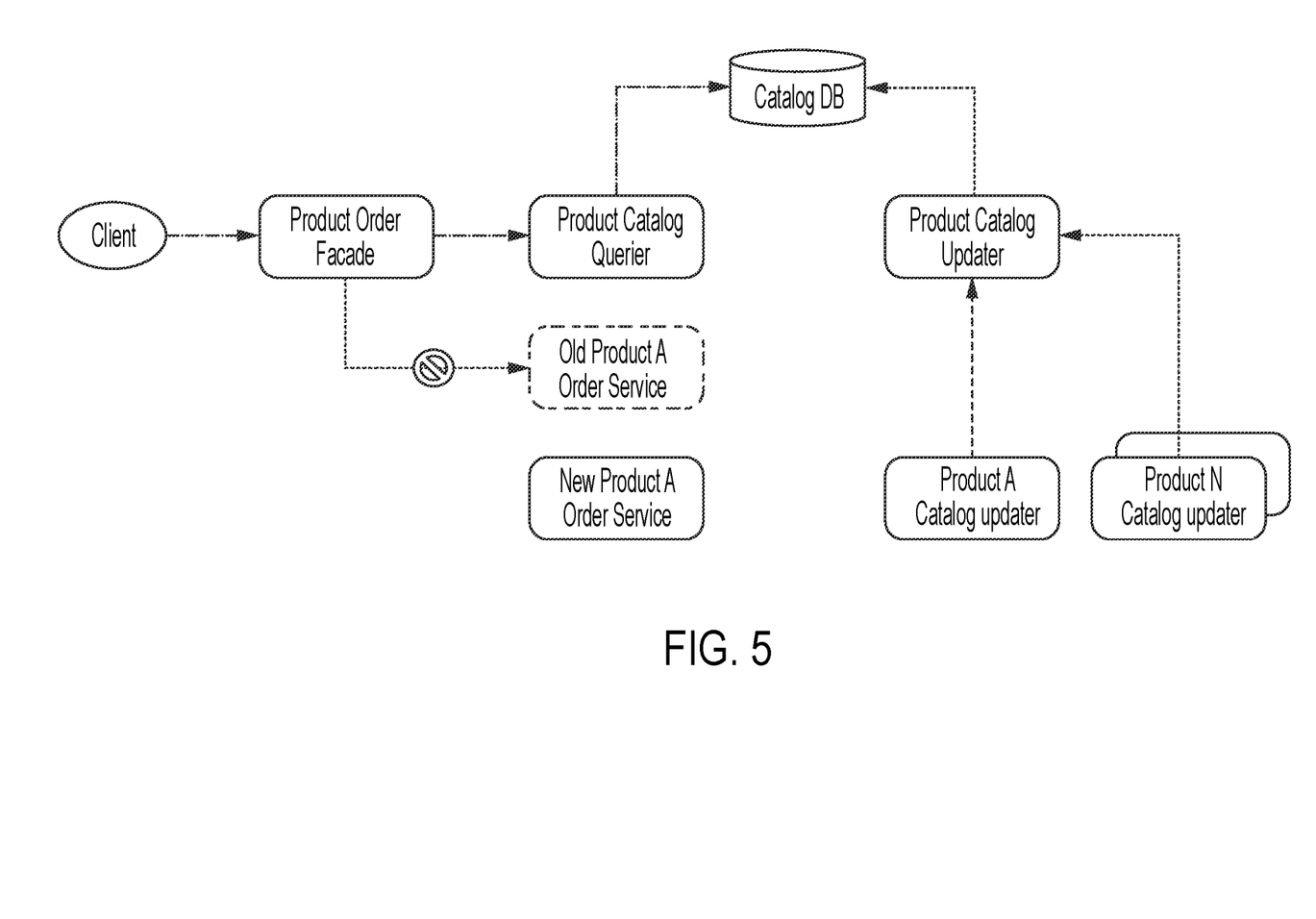
FIG. 5 is a flow diagram illustrating an issue with a service invoke chain in accordance with one or more embodiments of the present invention.
Figure 6:
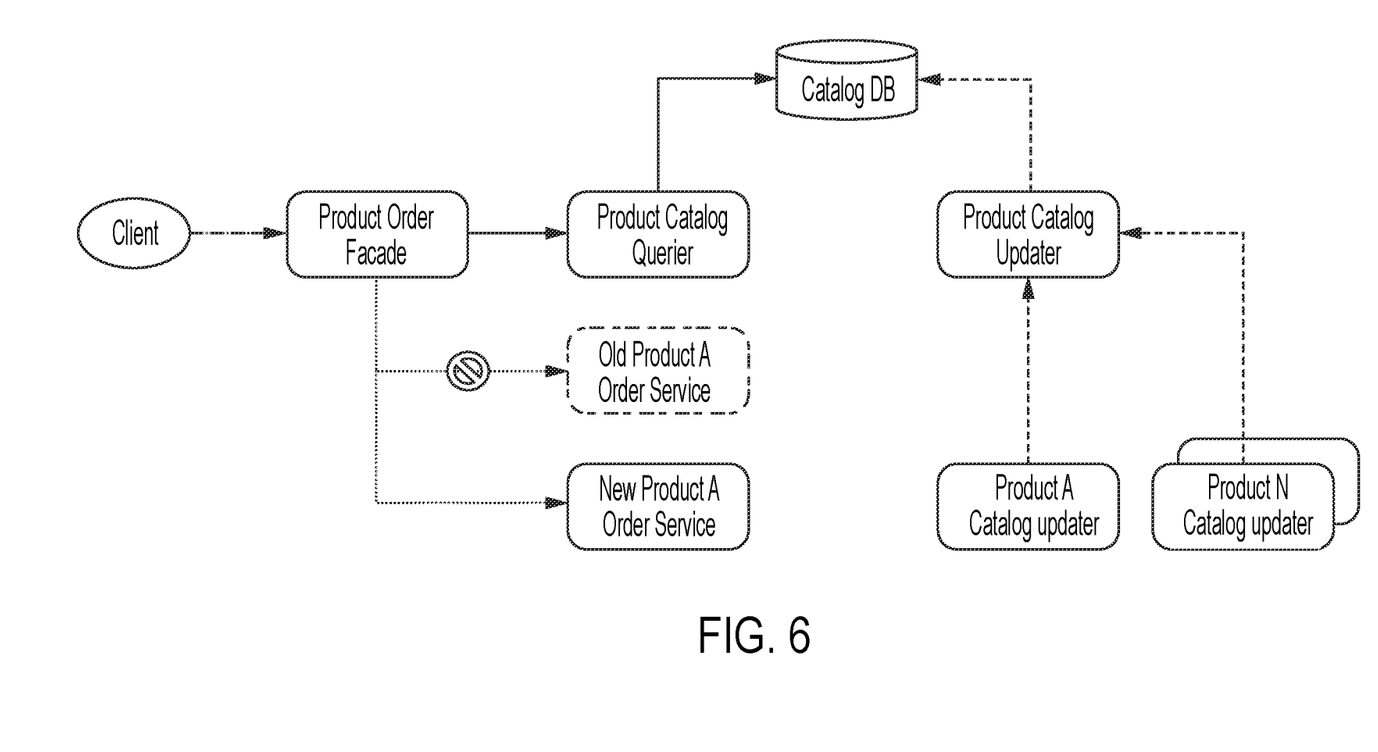
FIG. 6 is a flow diagram illustrating a solution of the issue with the service invoke chain in accordance with one or more embodiments of the present invention.

With reference to FIGS. 5 and 6, a situation in which there are several transactions among services with an asynchronous relationship between the services for a service mesh is illustrated (see FIG. 5) and a solution for the situation is illustrated (see FIG. 6).

With reference to FIG. 5, a product A catalog updater sends a new product A catalog to product catalog updater. The catalog product updater executes a batch update that stores other product catalogs to the catalog database, but does not yet store the new product A catalog. A client or user invokes an electronic product order form. The electronic product order form invokes a product catalog querier to obtain a catalog from the database. The database, at this time, stores an old product A catalog but has not yet stored the new product A catalog. The electronic product order form, as a result, provides an old product A order service to the user based on the product A catalog obtained by the product catalog querier from the catalog database.

With reference to FIG. 6, an execution of the computer-implemented method 300 of FIG. 3 provides a solution to the situation presented in FIG. 5. That is, that when the user makes the next invocation of the electronic product order form, the tracing data transformer $494_2$ modifies the data by changing a data timestamp of the next invocation. The simulator $493_2$ simulates an execution of the next user invocation of the service using the modified data to obtain a new response, which in this case would be the obtaining of the new product A catalog. This new product A catalog can then be provided to the user as a response to the next user invocation of the service in an event it is found that the user would not otherwise be provided with this version.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for a service mesh to simulate and address a situation in which there are several transactions among services with an asynchronous relationship between the services, the computer-implemented method comprising:
 identifying that the situation occurs with a response provided to a user upon a user invocation of one of the services;
 analyzing the situation to determine that the asynchronous relationship between the services caused an error in at least one of the several transactions;
 recording data of a next user invocation of the one of the services;
 modifying the data of the next user invocation of the one of the services to correct the error and to thereby generate modified data;
 simulating an execution of the next user invocation of the service using the modified data; and
 confirming that the modified data corrects the error based on results of the simulating of the execution of the next user invocation of the service.

2. The computer-implemented method according to claim 1, wherein the one of the services comprises an electronic product order form.

3. The computer-implemented method according to claim 2, wherein the situation comprises the electronic product order form using a product catalog querier to obtain a product catalog from a catalog database prior to the product catalog being stored in the catalog database.

4. The computer-implemented method according to claim 1, wherein the recording of the data comprises:
 updating a sampling rate of the data; and
 adding a new header to a request of the next user invocation of the service.

5. The computer-implemented method according to claim 4, wherein the updating of the sampling rate of the data comprises setting the sampling rate at 100% and the new header comprises a tracing instruction.

6. The computer-implemented method according to claim 1, wherein the modifying of the data comprises changing a data timestamp.

7. A computer-implemented method for operating a service mesh to simulate and address a situation in which there are several transactions among services with an asynchronous relationship between the services,
 wherein one of the services comprises an electronic product order form and the situation comprises an error caused by the electronic product order form using a product catalog querier to obtain a product catalog from a catalog database prior to the product catalog being stored in the catalog database,
 the computer-implemented method comprising:
 identifying a solution for the situation in a production environment; and
 simulating the solution in a simulator environment to confirm that the solution is corrective,
 wherein the solution comprises modifying data of a next user invocation of the one of the services to correct the error and to thereby generate modified data for use in the simulating of the solution and using the modified data in the simulating of the solution.

8. A computer program product for a service mesh to simulate and address a situation in which there are several transactions among services with an asynchronous relationship between the services, the computer program product comprising one or more computer readable storage media having computer readable program code collectively stored on the one or more computer readable storage media, the computer readable program code being executed by a processor of a computer system to cause the computer system to perform a method comprising:
 identifying that the situation occurs with a response provided to a user upon a user invocation of one of the services;
 analyzing the situation to determine that the asynchronous relationship between the services caused an error in at least one of the several transactions;
 recording data of a next user invocation of the one of the services;
 modifying the data of the next user invocation of the one of the services to correct the error and to thereby generate modified data;
 simulating an execution of the next user invocation of the service using the modified data; and
 confirming that the modified data corrects the error based on results of the simulating of the execution of the next user invocation of the service.

9. The computer program product according to claim 8, wherein the one of the services comprises an electronic product order form.

10. The computer program product according to claim 9, wherein the situation comprises the electronic product order form using a product catalog querier to obtain a product catalog from a catalog database prior to the product catalog being stored in the catalog database.

11. The computer program product according to claim 8, wherein the recording of the data comprises:
 updating a sampling rate of the data; and
 adding a new header to a request of the next user invocation of the service.

12. The computer program product according to claim 11, wherein the updating of the sampling rate of the data comprises setting the sampling rate at 100% and the new header comprises a tracing instruction.

13. The computer program product according to claim 8, wherein the modifying of the data comprises changing a data timestamp.

14. A computing system comprising:
 a processor;
 a memory coupled to the processor; and
 one or more computer readable storage media coupled to the processor, the one or more computer readable storage media collectively containing instructions that are executed by the processor via the memory to implement a method for a service mesh to simulate and address a situation in which there are several transactions among services with an asynchronous relationship between the services comprising:
 identifying that the situation occurs with a response provided to a user upon a user invocation of one of the services;
 analyzing the situation to determine that the asynchronous relationship between the services caused an error in at least one of the several transactions;
 recording data of a next user invocation of the one of the services;
 modifying the data of the next user invocation of the one of the services to correct the error and to thereby generate modified data;
 simulating an execution of the next user invocation of the service using the modified data; and
 confirming that the modified data corrects the error based on results of the simulating of the execution of the next user invocation of the service.

15. The computing system according to claim 14, wherein the one of the services comprises an electronic product order form.

16. The computing system according to claim 15, wherein the situation comprises the electronic product order form using a product catalog querier to obtain a product catalog from a catalog database prior to the product catalog being stored in the catalog database.

17. The computing system according to claim 14, wherein the recording of the data comprises:
 updating a sampling rate of the data; and
 adding a new header to a request of the next user invocation of the service.

18. The computing system according to claim 17, wherein the updating of the sampling rate of the data comprises setting the sampling rate at 100% and the new header comprises a tracing instruction.

19. The computer system according to claim 14, wherein the modifying of the data comprises changing a data timestamp.

20. A computing system comprising:
 a processor;
 a memory coupled to the processor; and
 one or more computer readable storage media coupled to the processor, the one or more computer readable storage media collectively containing instructions that are executed by the processor via the memory to implement a method for a service mesh to simulate and address a situation in which there are several transactions among services with an asynchronous relationship between the services,
wherein one of the services comprises an electronic product order form and the situation comprises an error caused by the electronic product order form using a product catalog querier to obtain a product catalog from a catalog database prior to the product catalog being stored in the catalog database,
the method comprising:
 identifying a solution for the situation in a first environment; and
 simulating the solution in a second environment to confirm that the solution is corrective,
wherein the solution comprises modifying data of a next user invocation of the one of the services to correct the error and to thereby generate modified data for use in the simulating of the solution and using the modified data in the simulating of the solution.

* * * * *